(12) United States Patent
Octeau et al.

(10) Patent No.: US 8,830,909 B1
(45) Date of Patent: Sep. 9, 2014

(54) METHODS AND SYSTEMS TO DETERMINE USER RELATIONSHIPS, EVENTS AND SPACES USING WIRELESS FINGERPRINTS

(75) Inventors: Damien Octeau, State College, PA (US); Arunesh Mishra, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 282 days.

(21) Appl. No.: 13/402,757

(22) Filed: Feb. 22, 2012

(51) Int. Cl.
*H04W 4/02* (2009.01)
(52) U.S. Cl.
CPC .................................... *H04W 4/025* (2013.01)
USPC ....................................... 370/328; 455/456.1
(58) Field of Classification Search
USPC ............ 370/328, 332; 455/440, 456.1, 456.2, 455/456.3, 456.4, 456.5, 456.6
See application file for complete search history.

(56) References Cited

U.S. PATENT DOCUMENTS

2011/0029571 A1* 2/2011 Aggarwal et al. ............. 707/798
2013/0218974 A1* 8/2013 Cao et al. ...................... 709/204

* cited by examiner

*Primary Examiner* — Hoon J Chung
(74) *Attorney, Agent, or Firm* — McDermott Will & Emery LLP

(57) ABSTRACT

Methods, systems, and articles of manufacture for tracking users based upon wireless fingerprint information are provided. These include accessing proximity records, clustering the proximity records based upon time information and user information to generate a plurality of clusters, identifying one or more events based upon the generated clusters, and outputting information related to the identified one or more events. Each proximity record includes user information. User information includes at least a first user identifier and a second user identifier respectively identifying a first user and a second user, and time information. Time information specifies one or more times when the first user and the second user have respective wireless fingerprints that are within a threshold fingerprint distance of each other.

14 Claims, 11 Drawing Sheets

METHODS AND SYSTEMS TO DETERMINE USER RELATIONSHIPS, EVENTS AND SPACES USING WIRELESS FINGERPRINTS

BACKGROUND

1. Field

This disclosure relates generally to tracking interactions of mobile users.

2. Background

As the utility and affordability of mobile terminals (smartphones, tablet computers, etc.) improve, an increasing number of users carry one or more mobile terminals for most of the day. Many mobile terminals have embedded global position system (GPS) devices that facilitate the determining of the mobile terminal's, and therefore, the user's location. Wireless network operators can collect user movement information including locations by using such embedded GPS devices as the users move from one wireless network coverage area to another.

However, GPS may not provide an adequate level of accuracy in some applications. Moreover, GPS may either be unavailable or unreliable in indoor and other environments in which a clear view of the sky is obstructed to some degree. Some systems utilize WiFi networks to achieve a higher degree of accuracy than what is afforded by GPS. Mobile terminals are, in general, surrounded by WiFi Access Points (APs). The strength of the signal received from an AP by a mobile terminal (MT) depends on several factors such as distance and the presence of obstacles. For any given location, a MT may receive signals from several APs with specific signal strengths. Therefore, it is possible to define a "WiFi fingerprint" as a set of signal strength measurements associated with APs. The APs are also characterized by their respective MAC addresses.

SUMMARY OF EMBODIMENTS

Methods, systems, and articles of manufacture for tracking of users based upon wireless fingerprint information are provided. These include accessing proximity records, clustering the proximity records based upon time information and user information to generate a plurality of clusters, identifying one or more events based upon the generated clusters, and outputting information related to the identified one or more events. Each proximity record includes user information. User information includes at least a first user identifier and a second user identifier respectively identifying a first user and a second user, and time information. Time information specifies one or more times when the first user and the second user have respective wireless fingerprints that are within a threshold fingerprint distance of each other.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

Figure 1A:
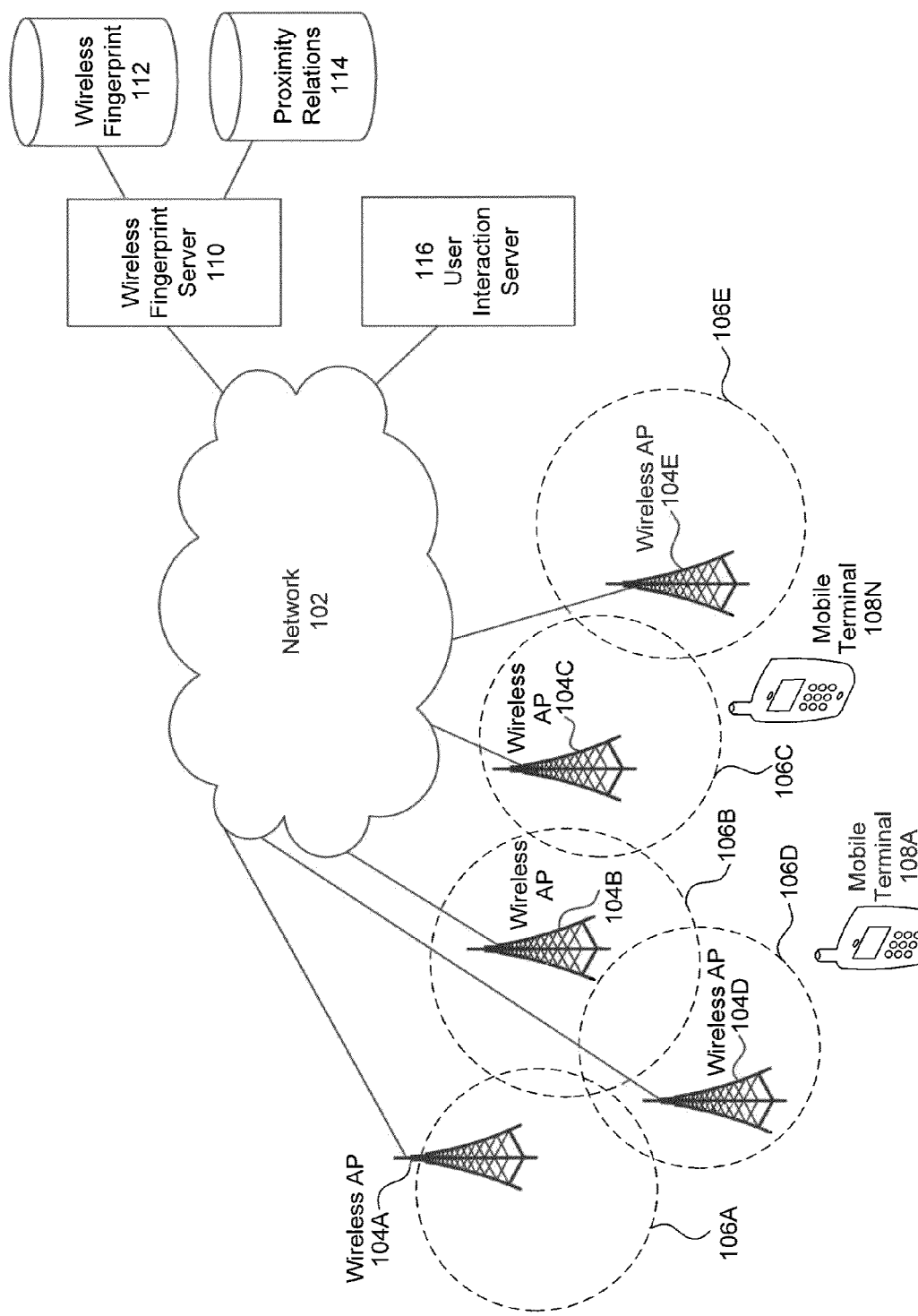
FIG. 1A illustrates a network environment to determine user relationships, events, and spaces using wireless fingerprints, according to an embodiment.

The present disclosure is generally directed to methods and systems to determine user relationships, events, and spaces using wireless fingerprints. Wireless fingerprint information may be used to gather information about MTs and associated users. Embodiments use proximity information that are determined from wireless fingerprints to determine responses to queries such as, for example, what other users a user has been in proximity with, what events are users involved in, where users spend time, and how many users are in particular geographic locations. In an embodiment, users may be afforded the option to opt-in prior to tracking, and in particular to tracking using wireless fingerprint information.

Users are identified based upon one or more mobile terminals carried by them. Specifically, wireless fingerprints of mobile terminals are correlated to determine when two or more users interact with each other, and the presence of users at various events and locations. The determined user relationships can be used, for example, to improve location tracking of users by correlating locations of respective users, and to determine interaction profiles for users by detecting instances where two or more users are within proximity.

A wireless fingerprint may be associated with any MT that is receiving one or more wireless signals. The received wireless signals may be, for example, from a cellular wireless network or from a WiFi network. The wireless fingerprint may be a measurement at the MT of the received wireless signals from each wireless access point (e.g., cellular base station, WIFI access point, etc.) within a limited range. A wireless fingerprint in a WiFi network, i.e. a fingerprint comprising signals received by the MT from one or more WiFi access points, is referred to herein as a "WiFi fingerprint." Other radio signals can be used in place of, or in addition to, WiFi. For example, raw cellular base-station signals or raw GPS satellite signals can also be used when available. The accuracy and range of fingerprint-based proximity detection would thus vary with the propagation characteristics of the underlying radio technology. Thus, the definition of a wireless fingerprint can include any radio signal received by the user's mobile device under consideration. The scope of a wireless fingerprint is thus only limited by the receiving capabilities of the mobile device. Thus, this definition includes existing and any new radio technologies that might get deployed.

In many cases, a WiFi fingerprint is associated with a location with greater accuracy than GPS location data, and may also be available in indoor and other environments in which GPS functions may be limited. However, in conventional systems, a wireless fingerprint is not associated with latitude/longitude information, so it is not possible to triangulate a user's location using a WiFi fingerprint alone. However, it is possible to define a distance function in the set of fingerprints that can determine a distance between any two WiFi fingerprints. That fingerprint distance may be directly correlated with the geographic distance between two MTs: if two users are in proximity, then their fingerprint distance will be low, whereas if they are not in proximity their fingerprint distance will be higher. In FIG. 3B, the WiFi fingerprint record 322 illustrates an exemplary format for a system to store and maintain the WiFi fingerprint for respective MTs.

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

FIG. 1A illustrates a network environment 100 to determine user relationships, events, and spaces using wireless fingerprints, according to an embodiment. A wireless network, including a plurality of wireless AP 104A-104E, is connected via a network 102 to wireless fingerprint server 110 and a user interaction server 116. A wireless fingerprint database 112 and a proximity relations database 114 may be directly or indirectly connected to wireless fingerprint server 110. Each wireless AP 104A-104E has a wireless coverage area 106A-106E. Users, including users represented by mobile terminals 108A-108N, move in the wireless network coverage areas 106A-106E.

Wireless AP 104A-104E may be cellular wireless base stations, such as base stations in wireless networks, or WiFi AP, such as, for example, AP in the IEEE 802.11 family of wireless protocols. The wireless network that comprises wireless AP 104A-104E may include one or both of an outdoor network and an indoor network. The wireless coverage areas 106A-106E may be the same or different sizes. For example, the radius of respective coverage areas may depend upon the access point signal strength and environmental conditions. MT 108A-108N may include smartphones, tablet computers, laptop computers, e-book readers, mobile entertainment devices, or any other device that is carried by users and which communicates wirelessly with one or more interconnection networks.

Wireless fingerprint server 110 operates to collect wireless fingerprints from MT, such as MT 108A-108N, in a database 112. A "database," as the term is used herein, may include any structured or organized manner of storing data. Wireless fingerprint server 110 may further operate to determine proximity relations based on wireless fingerprints. The determined proximity relations may be stored in a database 114.

Two or more wireless fingerprints from separate users that are within a distance threshold of each other may be considered to form a proximity relation. The distance threshold may be statically configured, or may be dynamically determined. Factors to be considered in configuring the distance threshold may include the distribution of pairwise distances in wireless fingerprint database 112, the type of determinations to be found from the proximity relationships, and the like. For example, the relative distances among wireless fingerprints of users may be large in sparsely populated areas when compared to highly urban areas, and a query may require that the number of users within 1000 feet from each other is known, and the like. Proximity relations database 114 may include proximity records, such as proximity records illustrated in FIG. 3A.

User interaction server 116 may operate to determine user relationships, events, and spaces using wireless fingerprints, according to an embodiment. User interaction server 116 may comprise a computer system, such as, computer system 121 illustrated in FIG. 1B. User interaction server 116, according to an embodiment may include a system for determining user relationships, events, and spaces using wireless fingerprints, such as, system 200 illustrated in FIG. 2.

Figure 1B:
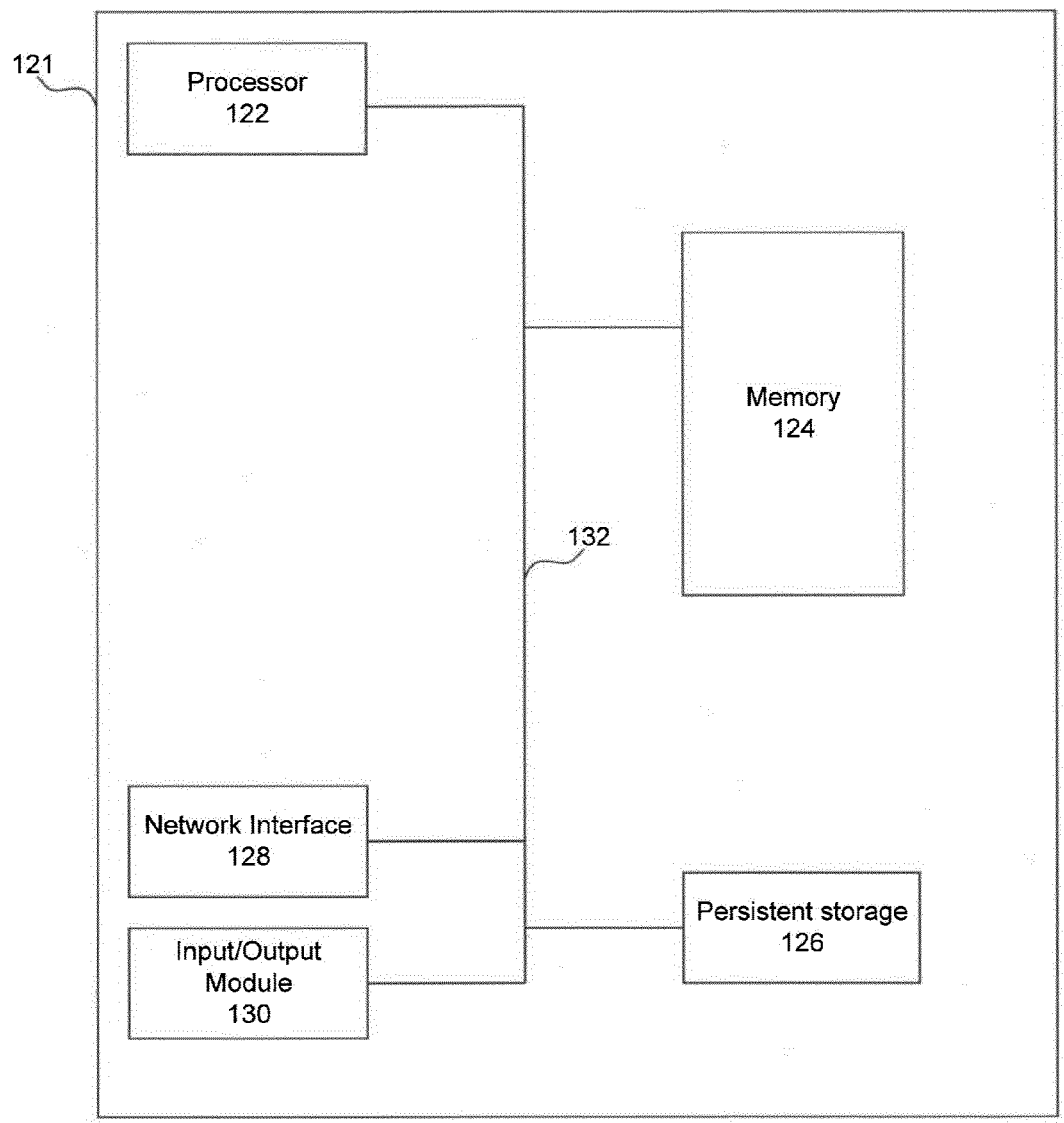
FIG. 1B illustrates a block diagram of a computer system in which embodiments may be executed.

FIG. 1B illustrates a computer system 121 which may execute instructions to determine user relationships, events, and spaces using wireless fingerprints, according to an embodiment. Computer system 121 includes a processor 122 which may include any computer or electronic processor for executing and/or processing information, including wireless fingerprint information. Processor 122 may include or be part of any device capable of processing any sequence of instructions. Processor 122 may include, for example, a computer processor, a processor in a mobile device or other electronic and/or digital processor. Processor 122 may, for example, be included in a computer, a server, a server farm, a cloud computer, a mobile computing device, and the like.

Processor 122 may be connected to a memory 124 via a bus 132. Memory 124 may include volatile memory, persistent, virtual or otherwise, to store information for use by or output by the system 121. Memory 124 may include, for example, random access memory (RAM) and/or dynamic RAM (DRAM). Memory 124 may be used to store any information, such as state information of system 121. Memory 124 may, for example, also be used to store instructions and data of system 121. System 121 may include one or more processors 122 as necessary or appropriate.

Bus 132 may include a communication infrastructure that allows interaction between the various components of system 121. Bus 132 may, for example, carry data between the components of system 121, such as between processor 122 and memory 124. Bus 132 may include a wireless and/or wired communications medium between the components of system 121, and may include parallel, serial or other topological arrangements.

A persistent storage 126 may include components such as memory or other persistent storage as is used by system 121 to store data over some extended period of time (e.g., as compared to memory 124). Persistent storage 126 may include non-volatile main memory as used by processor 122 in system 121. Persistent storage 126 may include, for example, flash memory, a hard disk or optical disk.

Network interface 128 couples computer system 121 to a network, such as network 102 shown in FIG. 1. Network interface 128 may include one or more network interface of wireless or wired types. Computer system 121, for example, may receive wireless fingerprints and related information from MTs 108A-108N through network interface 128.

Input/output module 130 operates to couple input devices, such as, keyboard, mouse, and/or other input interfaces to computer system 121. Input/output module 130 can also couple output devices such as printers, external disks, and the like, to computer system 121. Configuration for a system to determine user relationships, events, and spaces using wireless fingerprints, according to an embodiment, may be entered through interface 130.

Figure 2:
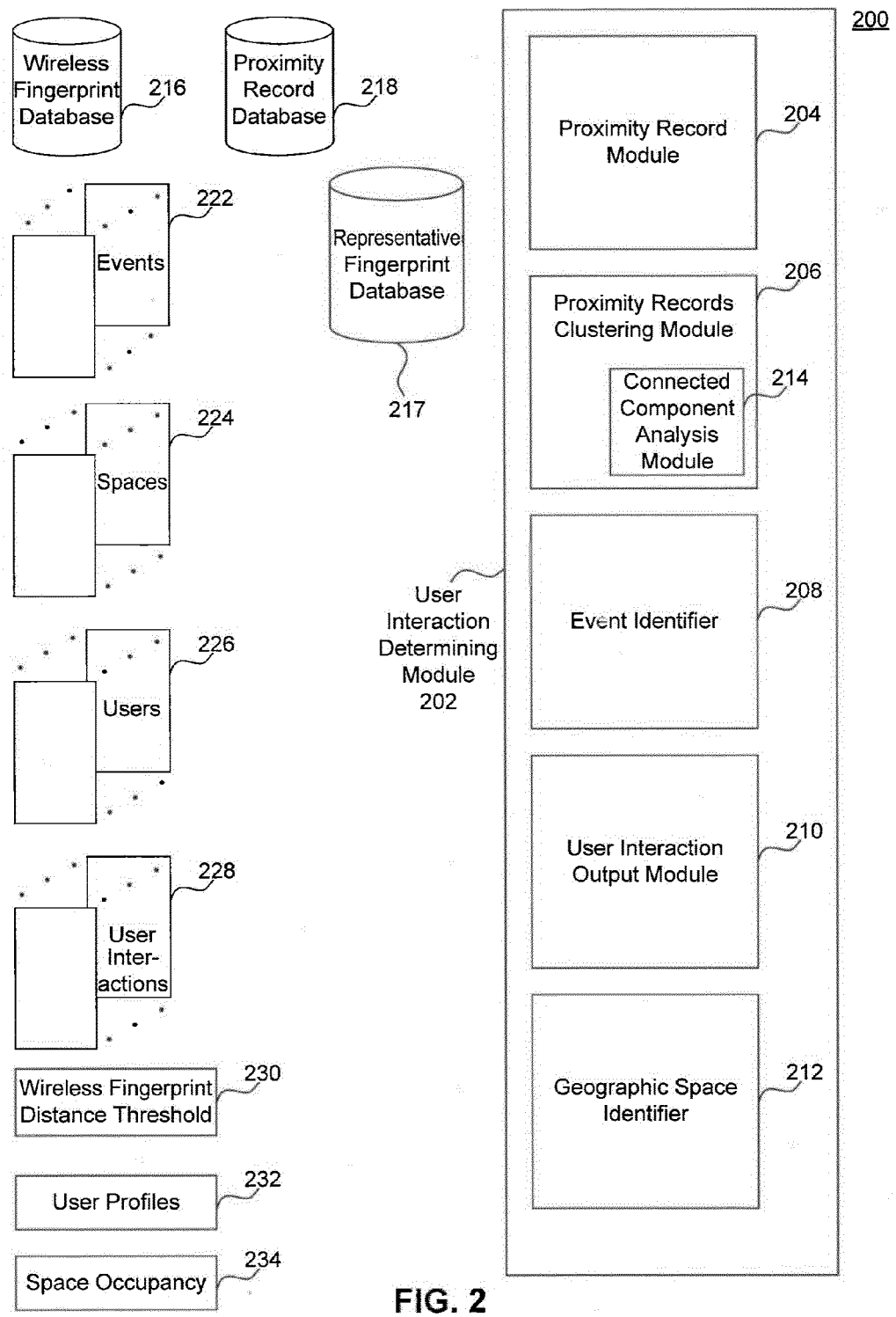
FIG. 2 illustrates a system for determining user relationships, events, and spaces using wireless fingerprints, according to an embodiment.

FIG. 2 illustrates a system 200 for determining user relationships, events, and spaces using wireless fingerprints, according to an embodiment. System 200 includes a user interaction determining module 202 that operates to determine one or more of user relationships, events, and spaces using WiFi fingerprints.

User interaction determining module 202 may have access to, or may include, a wireless fingerprint database 216 and a proximity records database 218. Wireless fingerprint database 216 includes wireless fingerprint information for users of one or more wireless networks. A wireless fingerprint database is described above in relation to FIG. 1A. Proximity records database 218 includes proximity records. Proximity records relate two or more users who are in proximity to each other during a specific time interval. A proximity records database is described above in relation to FIG. 1A.

User interaction determining module 202 may include a proximity record module 204, proximity records clustering module 206, an event identifier 208, a user interaction output module 210, and a geographic space identifier 212.

Proximity record module 204 operates to access proximity records for use in determining user relationships, events, and spaces using wireless fingerprints. According to an embodiment, proximity record module 204 may operate to add/modify/or delete proximity records from proximity records database 218. Proximity records may be added/modified or removed from proximity records database 218 based upon a threshold distance such as wireless fingerprint distance threshold 230. For example, proximity record module 204 may include logic to analyze wireless fingerprint data in wireless fingerprint records database to determine wireless fingerprints that have a distance that is less than the threshold distance 230, to generate proximity records corresponding to such fingerprints, and to add the newly generated proximity records to proximity records database 218. Proximity record module 204 can include logic to filter proximity records based on, for example, user or group of users, time information, and proximity distances.

Proximity clustering module 206 operates to cluster proximity records, such as the proximity records accessed through proximity record module 204. The clusters may be based upon user information, time information, and proximity distances. According to an embodiment, a cluster comprises proximity records such that, for respective time intervals for the entire duration from a start time to an end time there is at least one proximity record in the cluster and for each proximity record in the cluster there is at least one other proximity record that overlaps it in terms of users and time.

Clustering of the proximity records may be performed using one of several known clustering methods. According to an embodiment, connected component analysis (CCA) technique may be performed to achieve the clustering. The CCA can be implemented using connected component analysis module 214. The CCA can be performed upon a graph generated from a selected group of proximity records. Each selected proximity record may be represented as a vertex in the graph. In one example, an edge between two vertices exists if and only if the corresponding proximity records overlap in time and in username. The connected components can be found by traversing the graph, for example, using a depth-first search. According to an embodiment, after the connected components of the graph have been identified objects may be created corresponding to each user in a connected component, and each created object may include the username and the duration.

Figure 7A:
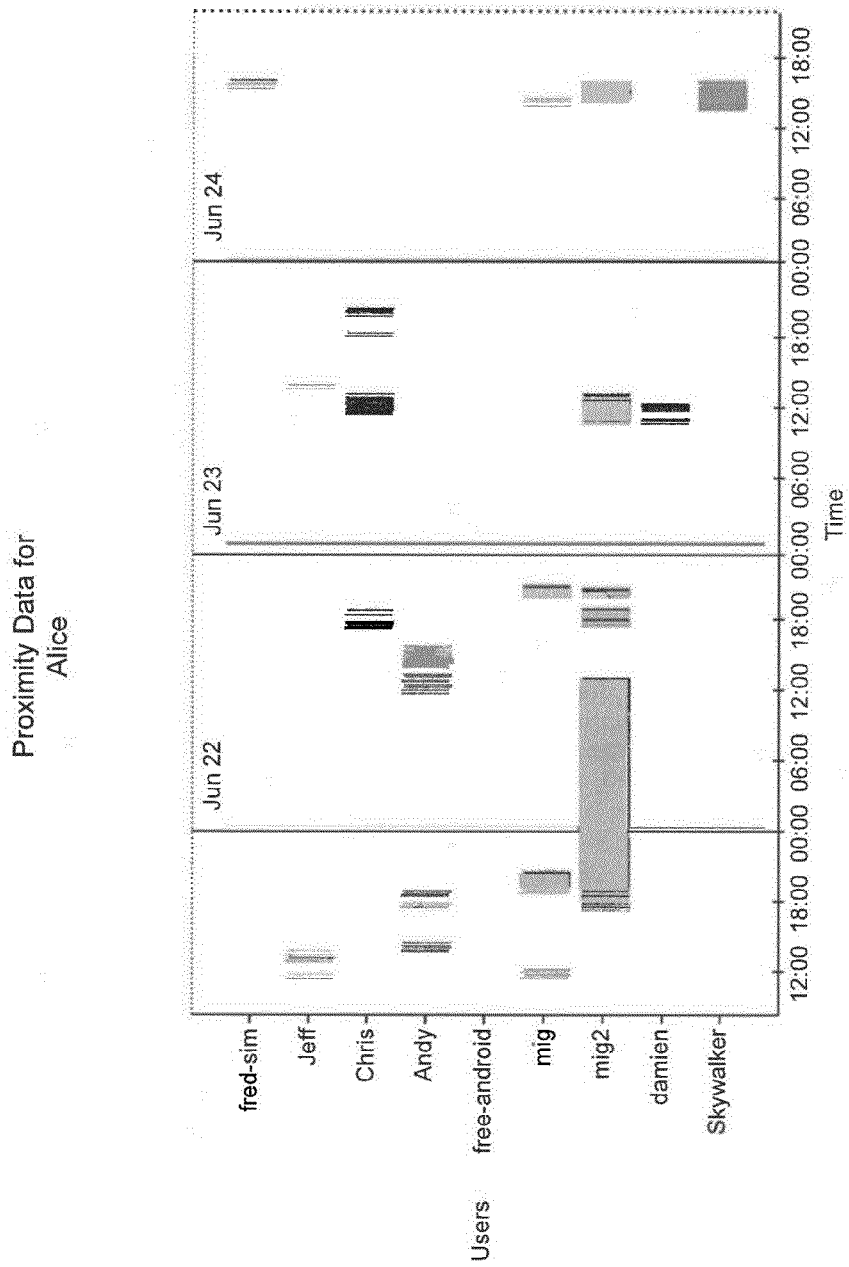
FIG. 7A illustrates an example display of proximity relationships of a user, according to an embodiment.
Figure 7B:
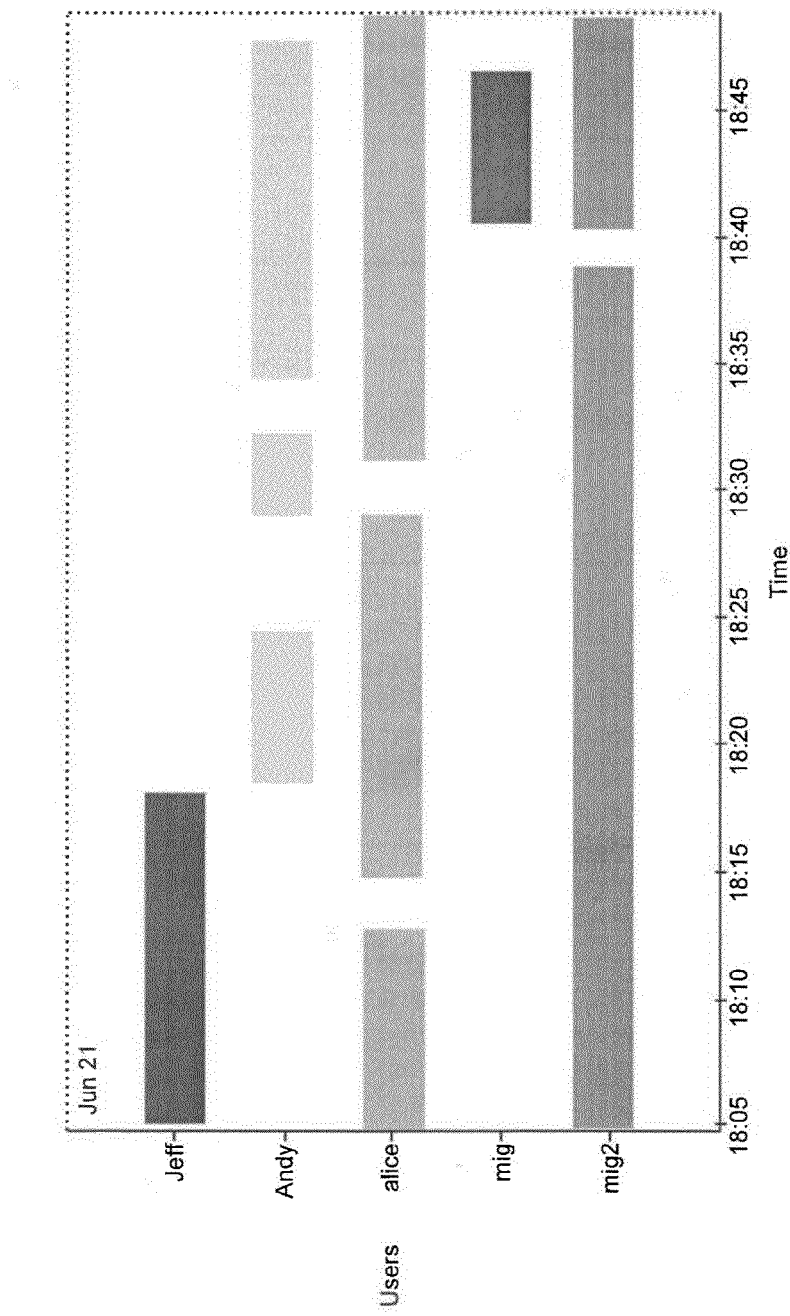
FIG. 7B illustrates an example display of an event, according to an embodiment.

Event identifier 208 operates to identify events. An "event" is a proximity interaction between two or more users. An event starts when two users start being in proximity. Other users may join and become in proximity with event members. The event ends when there are not any event members in proximity anymore. FIG. 7B illustrates an event in graphical form. A user may join and exit an event any number of times during the event. According to an embodiment, an event corresponds to each connected component (or cluster) that is determined, for example, by proximity clustering module 206. Events "may" be associated with a particular "location" or a "space" as identified by a set of fingerprints that have a certain amount of similarity among them. For example, a group of people walking together may not have a location associated with the "event." However, a group of people in a cafe, and others joining in, may have a location or a "space" as defined below. According to an embodiment, an object may be created to represent each interaction of a user with each event. Thus, for example, if a user joins and exits an event multiple times over the duration of the event, multiple objects can be created corresponding to that user and the event. The object may include the username and the duration of the event. The object may also include the time interval during which the user was in proximity to the event. For example, user interaction objects 228 may be created in a memory, such as memory 124, to represent each interaction of a user with an event.

Other objects, such as user objects 226 and event objects 222 may also be created. User objects 226 can represent individual users for whom proximity information appears in proximity records database 218. Event objects 222 may represent events as determined by the clustering described above. According to an embodiment, an event object may have an event identifier, and a start time and an end time defining the duration of the event. Event objects may also include links to user objects 226 and/or user interaction objects 228 so that participants for the event can be determined.

Geographic space identifier module 212 operates to identify geographic spaces based upon the proximity records. A "space" or "geographic space", as the terms are used herein, is a geographic location which can be characterized by a set of wireless fingerprints with a low pairwise distance. A pairwise distance threshold may be configurable for different types of spaces. For example, respective pairwise distance thresholds can be configured to identify cubicles, sets of adjacent cubicles, conference rooms, sports stadium, etc.

According to an embodiment, geographic space identifier module 212 can use a sampling technique to determine spaces and/or to fine-tune the determined spaces. The system is initialized with a number of spaces for which representative fingerprints are determined. The representative fingerprints can be determined by, for example, performing a WiFi scan in each respective geographic area for which a space is to be defined. A "scan," according to an embodiment, is a wireless fingerprint determined on a test mobile terminal. Wireless fingerprints for users determined at subsequent intervals can be compared against the representative fingerprints of respective spaces. User wireless fingerprints that are within a low distance from one or more of the representative fingerprints of a space can be determined as being within that same space. If a user wireless fingerprint does not match any of the spaces, a new space may be created with that user wireless fingerprint as one of the representative fingerprints for the newly created space. According to another embodiment, if a match is detected between a user's wireless fingerprint and a representative fingerprint of a space, that user fingerprint can be used to improve the representative fingerprints for that space. Representative fingerprints may be stored in representative fingerprint database 217. Predetermined spaces and newly determined spaces can be maintained in memory on spaces 224 data structure. User wireless fingerprints used in comparing to representative fingerprints may be obtained from wireless fingerprint database 216.

Figure 7C:
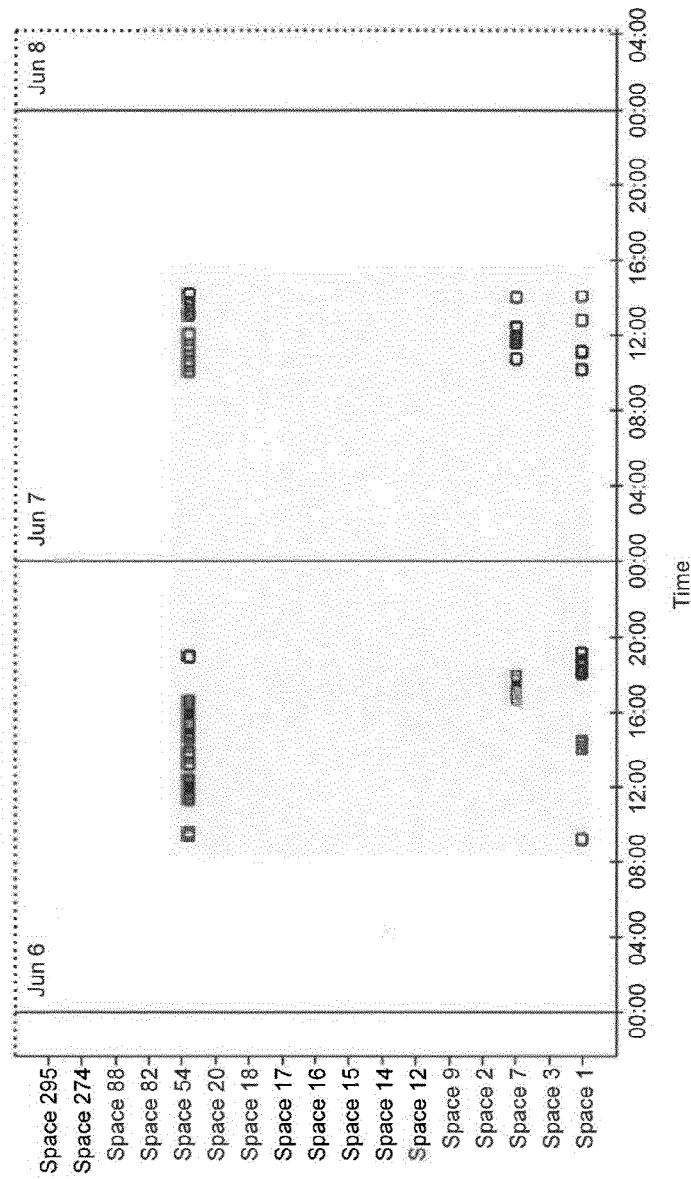
FIG. 7C illustrates an example display of utilization of geographic spaces, according to an embodiment.

User interaction output module 210 operates to output user interaction information such as interaction profiles 232 for users, event information, and space information, such as space occupancy 234. The output may be provided as a response to one or more queries. A user interaction profile 232 for a user may include information as to what other users the user was in proximity to and at what times. FIG. 7A is an exemplary illustration of a displayed user interaction profile. Event information can include the duration of the event, which users were in proximity to the event, and how much time each user spent at the event. FIG. 7B is an exemplary illustration of graphically presented event information. Geographic space information can include information such as how many users were in a space at any particular time. Geographic space information can also include the occupancy 234 details of respective spaces. Occupancy information can include the number of all users in the space during a specified time interval, and their identities. FIG. 7C graphically illustrates the utilization of various available spaces, and FIG. 7D graphically illustrates the occupancy of a selected geographic space.

Figure 3A:
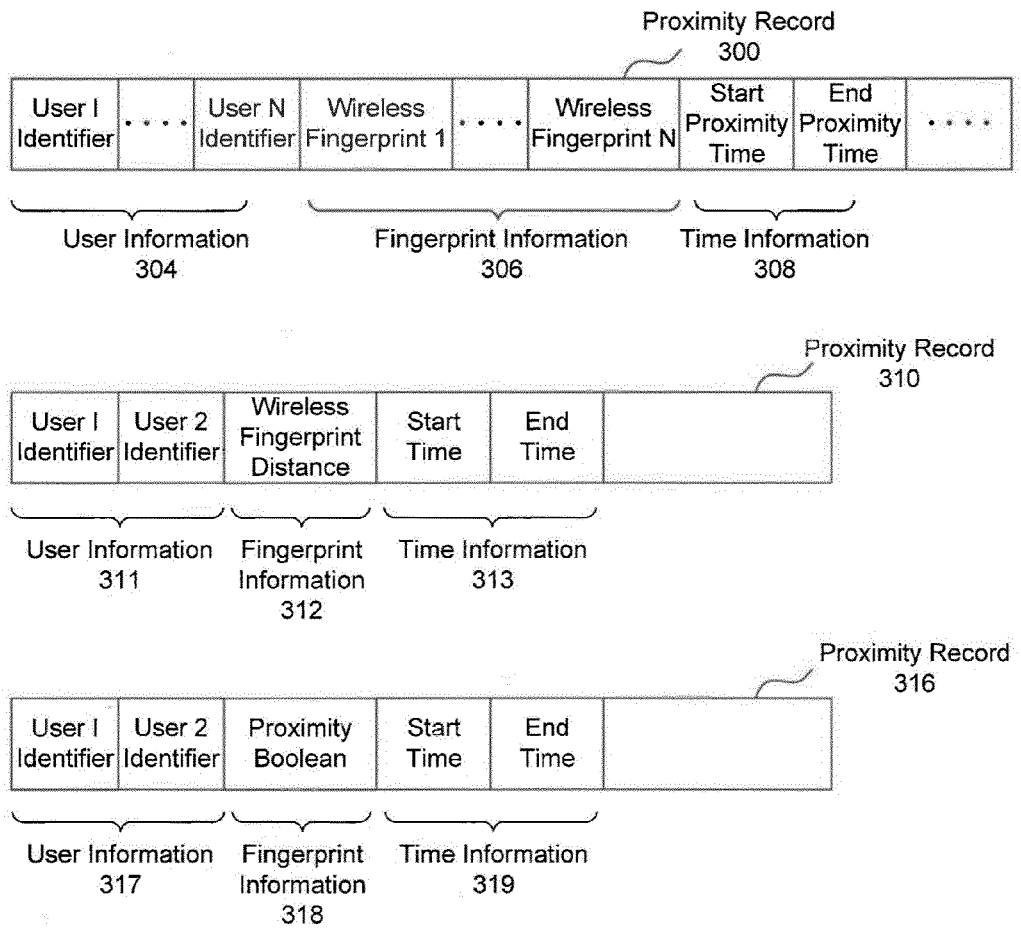
FIG. 3A illustrates exemplary proximity records, according to some embodiments.
Figure 3B:
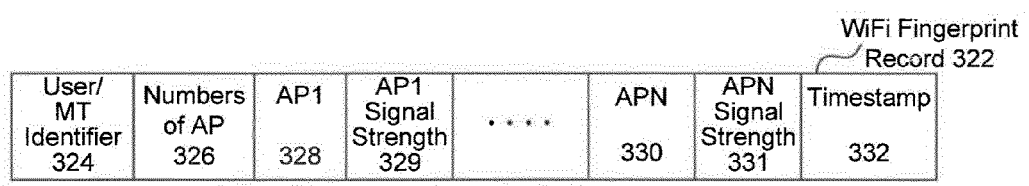
FIG. 3B illustrates an exemplary wireless fingerprint record, according to an embodiment.

FIG. 3A illustrates proximity records 300, 310, and 316, according to some embodiments. As described above, a proximity record includes information regarding the proximity of users derived from wireless fingerprints of the corresponding MTs. According to an embodiment, a proximity record exists for each time interval during which two or more users are within a threshold level of proximity to each other. The threshold level of proximity can be calculated based upon the respective wireless fingerprints of the users. According to an embodiment, a separate proximity record is created for each pairwise user proximity relation.

Proximity record 300 includes user information 304, fingerprint information 306, and time information 308. User information 304 can include information for two or more users that are within proximity. The user information for each user may include a user identifier, which may, in some embodiments, be the MAC address of the corresponding MT. In other embodiments, a unique numeric or alphanumeric identifier is used for each user. The unique identifier can then be associated with other databases in order to obtain additional information about the user. For example, a unique alphanumeric identifier can be assigned to each user, which can be used subsequently to associate the proximity records with other information about the user. For each of the users specified in user information 304, wireless fingerprint information 306 includes a wireless fingerprint. Time information 308 includes a start time and an end time for the proximity relationship represented in the proximity record 300. Proximity records can be stored in proximity database 218.

Proximity record 310 illustrates an alternate format for the proximity records. The illustrated proximity record 310 includes two users in the user information portion 311, a distance between the wireless fingerprints of the two users in the fingerprint information portion 312, and time information portion 313.

Proximity record 316 illustrates yet another alternate format for proximity records. The illustrated proximity record 316 includes two users in the user information portion 317, a field in the fingerprint information portion 318 to indicate whether or not the distance between the two users as represented by the respective wireless fingerprints is less than a proximity threshold, and time information portion 319.

FIG. 3B illustrates a wireless fingerprint record 322. As described above, a wireless fingerprint record includes at least one wireless fingerprint determined for a client. The illustrated, wireless fingerprint record 322 includes a user/MT identifier 324, the number of access points 326 from which signals are received at the mobile terminal, a timestamp 332 representing the time at which the corresponding fingerprints were determined, and, for each access point from which a signal is received, the identifier for the access point (e.g., MAC address) and the received signal strength.

Figure 4:
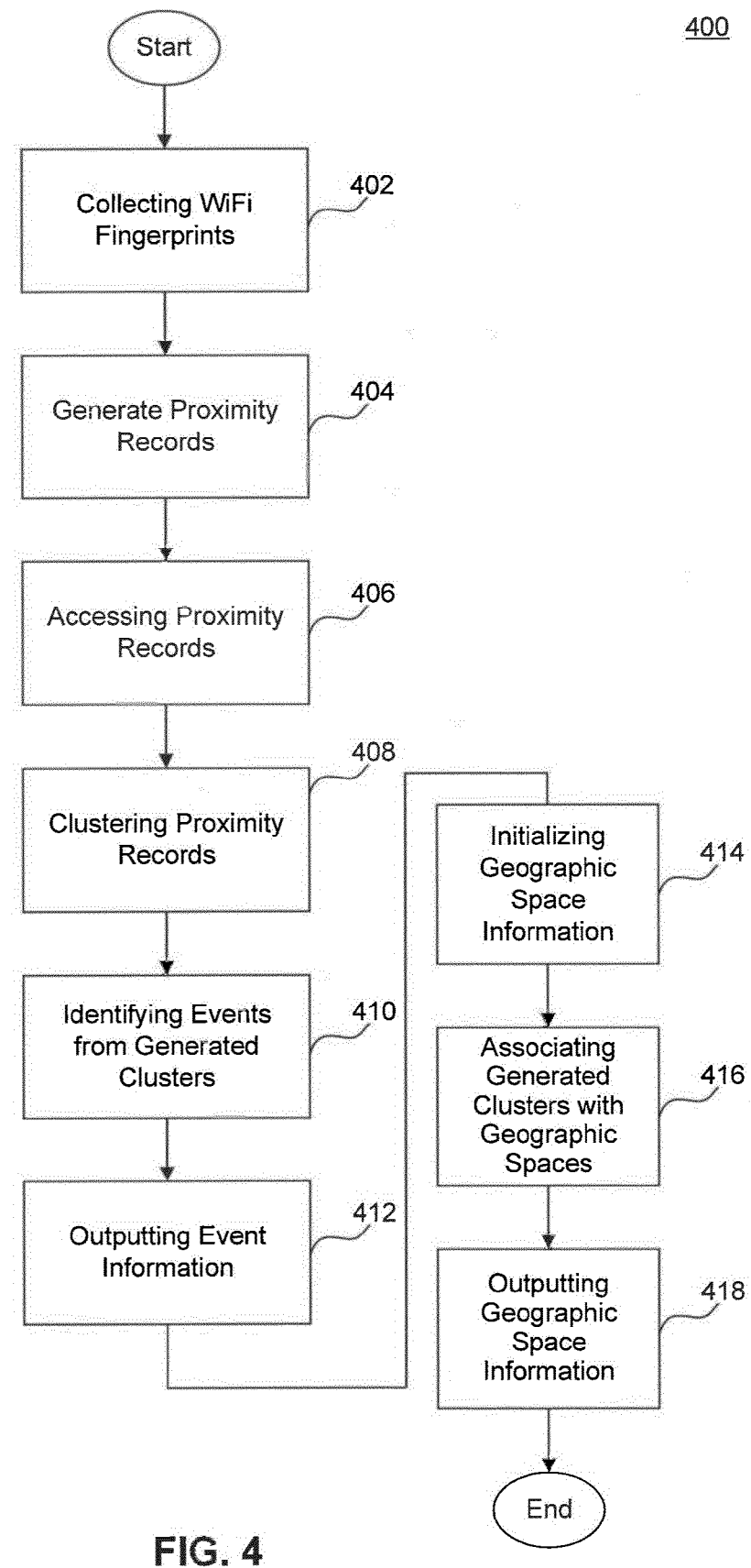
FIG. 4 illustrates a method for determining user relationships, events, and spaces using wireless fingerprints, according to an embodiment.

FIG. 4 illustrates a method 400 for determining user relationships, events, and spaces using wireless fingerprints, according to an embodiment. Method 400 can, for example, be performed by user interaction module 202. It may not be required that all steps 402-418 are executed or that the steps 402-418 are performed in the order shown.

At step 402, wireless fingerprints are collected. Wireless fingerprints were described above, and may include WIFI fingerprints. Collecting of wireless fingerprints may be performed by periodically measuring the strength of signals received from one or more respective access points at mobile terminals. Wireless fingerprints measured at the respective mobile terminals are then received at a wireless fingerprint server that can store it for use by applications such as proximity relationships, and the like. According to an embodiment, at regular intervals, each mobile terminal measures the received signals and transmits a time-stamped wireless fingerprint to a collection server. At the collection server, a measurement interval may be configured such that all wireless fingerprints received from mobile terminals during an interval are considered to be measured at the same time.

At step 404, proximity records are generated. The proximity records are generated from wireless fingerprints. As described above, a proximity record can be based upon two or more wireless fingerprints that are within a short distance from each other for an interval. The distance, as described above, is determined based upon comparing the respective wireless fingerprints of the two mobile terminals. The generated proximity records are saved in a database.

According to an embodiment, the generated proximity record indicates only whether the corresponding two or more users were in proximity during the interval. In other embodiments, the generated record indicates the actual calculated distance between the two or more proximate users, or may specify one of several categories of distance between the two or more proximate users. In yet other embodiments, proximity records can include wireless fingerprints of the users included in the record. Example proximity record formats are shown in FIG. 3A.

The threshold proximity distance may be configurable. If two or more wireless fingerprints are less than a threshold proximity distance away from each other, and they overlap in time and users, then they are considered to be in proximity, and a corresponding proximity record is generated. The overlap may be partial. The threshold proximity distance may be configured based upon various factors, such as, but not limited to, the type of environment over which data is collected, and the data collection interval. In some embodiments, the system may dynamically configure the threshold proximity distance based upon an analysis of the wireless fingerprints. For example, the threshold proximity distance may be set at a higher value in environments in which users are sparsely spread out and/or when the query requirements call for detecting users who are simultaneously present at an event in a relatively large space (e.g., sports stadium).

At step 406, proximity records are accessed. Proximity records that are stored in a proximity records database can be accessed using time-based and/or user-based filters. In some embodiments, the proximity records database can be accessed without any filter.

At step 408, proximity records are clustered. The clusters are based upon user information, time information, and proximity information. According to an embodiment, a cluster comprises proximity records such that, for respective time intervals for the entire duration from a start time to an end time there is at least one proximity record in the cluster and for each proximity record in the cluster there is at least one other proximity record that overlaps it in terms of users and time.

Clustering, of the proximity records may be performed using one of several known clustering methods. According to an embodiment, the CCA technique may be performed to cluster the proximity records. The CCA can be performed upon a graph generated from a selected group of proximity records. Each selected proximity record may be represented as a vertex in the graph. An edge between two vertices exists if and only if the corresponding proximity records overlap in time and in username. The connected components can be found by traversing the graph, for example, using a depth-first search. According to an embodiment, after the connected components of the graph have been identified, objects may be created corresponding to each user in a connected component, and each created object may include the username and the duration.

At step 410, events are identified from the clusters created in step 408. As described above, an event is a proximity interaction between two or more users. An event starts when two users start being in proximity. Other users may join and become in proximity with event members. The event ends when there are not any event members in proximity anymore. According to an embodiment, an event corresponds to each connected component (or cluster) that is determined. Another method of clustering proximity records can be purely based on the set of fingerprints that comprise a space. A proximity record can be compared to this set, and if the similarity criteria (distance based) gets satisfied, the record now belongs to this space at the given time internal for the record. Two records thus can overlap if they belong to the same space and overlap in time. This can reduce any estimation error from comparing two proximity records directly 1:1.

At step 412, event information is output. FIG. 7B illustrates an event in graphical form. Output event information can include event sequences, event times and durations, and participants at events. The output event details can be tailored accordingly to respond to a received query.

At step 414, geographic space information is initialized. As described above, the system is initialized with a number of known geographic spaces and representative wireless fingerprints for each of those geographic spaces. The representative wireless fingerprints can be obtained by actual measurement of wireless signals received using a test MT within the geographic spaces.

At step 416, the generated one or more clusters are associated with geographic spaces. A geographic space is a geographic location which can be characterized by a set of wireless fingerprints with a low pairwise distance. A pairwise distance threshold may be configurable for different types of spaces.

According to an embodiment, wireless fingerprints for users determined at subsequent intervals can be compared against the representative fingerprints of respective spaces. Wireless fingerprints that are within a distance threshold from one or more of the representative fingerprints of a geographic space can be determined as being within that geographic space. If a wireless fingerprint does not match any of the spaces, a new space may be created with that user wireless fingerprint as one of the representative fingerprints for the newly created space. According to another embodiment, if a match is detected between a wireless fingerprint and a representative fingerprint of a geographic space, that user fingerprint can be used to improve the representative fingerprints for that geographic space.

At step 418, the determined geographic space information is output. The output geographic space information can include occupancy information for one or more geographic spaces. The occupancy information can, for example, specify the number of people and identities of the people who are present in a space at a given time. Other information that may be output can include, but is not limited to, a list of spaces visited by a person or group of persons over some time interval.

Figure 5:
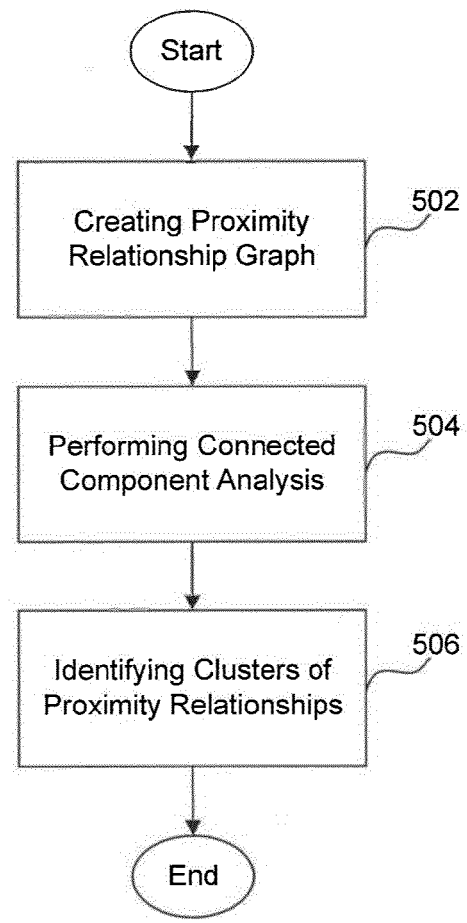
FIG. 5 illustrates a method for identifying proximity relationships, according to an embodiment.

FIG. 5 illustrates a method 500 for identifying proximity relationships, according to an embodiment. Method 500 may be used in performing step 408. According to an embodiment, proximity records clustering module 206 may implement method 500.

At step 502, a proximity relationship graph is created. According to an embodiment, each proximity relationship is a vertex in the graph. An edge between two vertices is drawn if and only if the corresponding proximity relationships overlap in time and in users. The resulting graph, therefore, has vertices corresponding to proximity relationships and an edge between every pair of proximity relations that overlap in time and in users.

At step 504, CCA is performed upon the graph created at step 502. CCA identifies groups of vertices (or clusters) in the graph such that any two proximity relationships belonging to a cluster can be connected with a sequence of proximity relationships (from the cluster) that pairwise overlap in time and in users. It is noted that other methods of clustering may be used in generating the clusters of proximity relationships.

At step 506, events are identified based upon the clusters. According to an embodiment, each respective cluster is an event. In some other embodiments, groups of clusters maybe formed for each event. For example, groups of clusters that are separated by time intervals that are less than a separation threshold and user information less than a threshold (e.g., clusters that have overlapping or nearly overlapping times and that have a high portion of users in common) may be identified as forming a single event.

Figure 6:
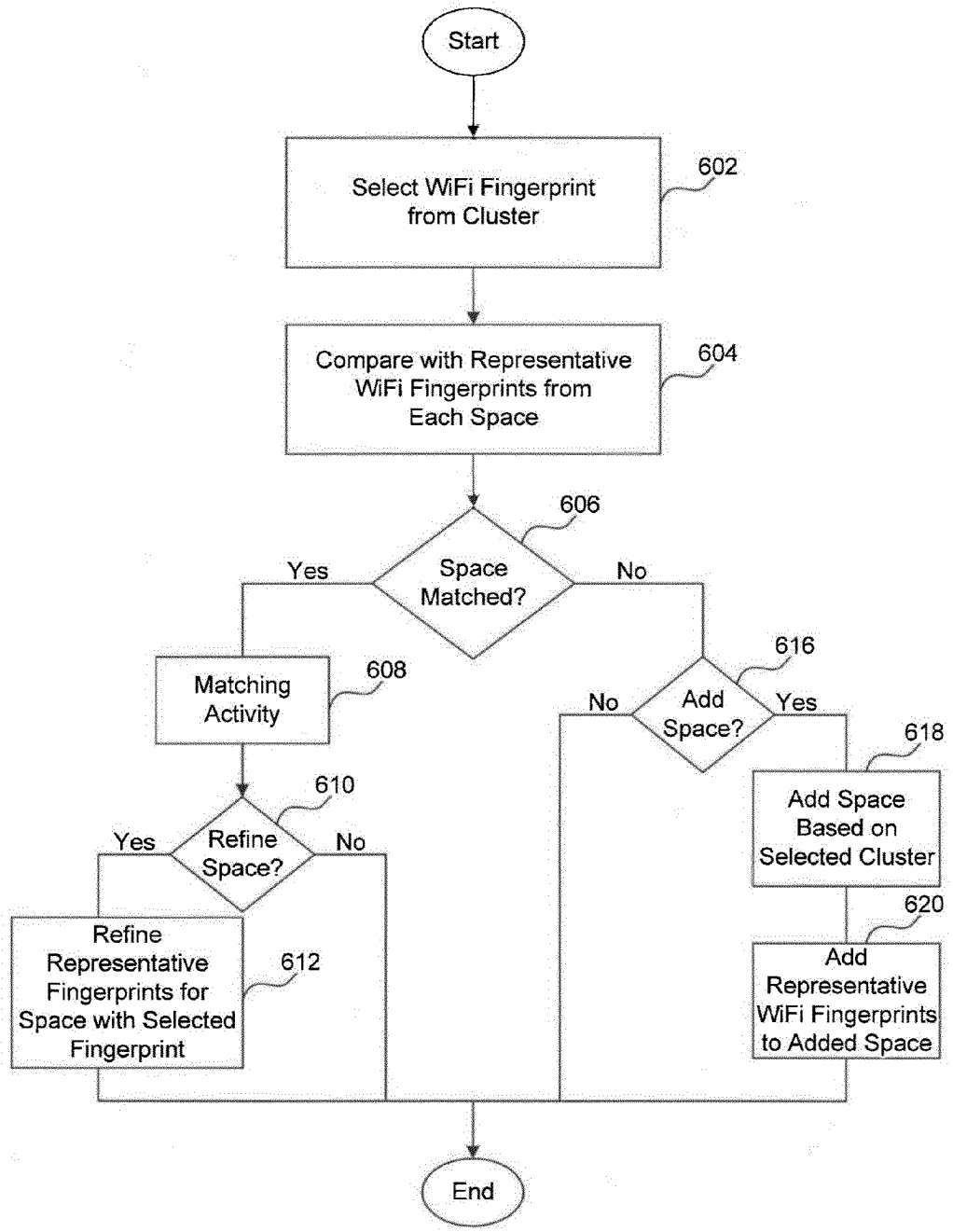
FIG. 6 illustrates a method for determining spaces, according to an embodiment.

FIG. 6 illustrates a method 600 for determining and/or enhancing geographic spaces, according to an embodiment. Method 600 can be performed for each cluster of proximity relationships in order to determine a geographic space associated with that cluster. Steps 602-620 of method 600 may be performed in an order different from what is illustrated, and all steps may not need to be performed.

At step 602, one of the clusters of proximity relationships is selected, and a wireless fingerprint is selected from the cluster. According to an embodiment, method 600 can be performed to process at least one wireless fingerprint from each of the clusters of proximity relationships. By processing at least one wireless fingerprint from each proximity cluster using method 600, a geographic space may be associated with each identified event.

Steps 604-620 are performed to compare the selected user wireless fingerprint to representative wireless fingerprints from each geographic space. Steps 604-620 can be iteratively performed for respective selected user wireless fingerprints until one of the known geographic spaces is selected as the best match or it is determined that none of the known geographic spaces match the selected user wireless fingerprint. According to an embodiment, the selected user wireless fingerprint is compared to the representative fingerprints from each known geographic space.

At the end of comparing to all known geographic spaces, at step 606, it is determined whether a match has occurred. The determination may be based upon the fingerprint matching distance between the selected user wireless fingerprint and the one or more representative fingerprints from each known geographic space. If a matching distance below a determined threshold was obtained for any known geographic space, then it is determined that a match has occurred. Otherwise, it is determined that no match occurred.

If a match occurred, then at step 608, a best match is determined. For example, the matching distances obtained for the selected user wireless fingerprint in relation to each of the known geographic spaces is compared. The known geographic space which has the lowest matching distance to the selected user wireless fingerprint is selected as the best match for the selected user wireless fingerprint.

After selecting the best match geographic space, at step 610 a decision may be made whether the representative wireless fingerprints of the best match known geographic space require refinement. The representative wireless fingerprints of a geographic space may require refinement, for example, if there is less than a threshold number of representative wireless fingerprints for that geographic space. Other factors, such as the range over which the representative wireless fingerprints of the selected geographic space spread compared to other geographic space, may also be considered in deciding whether to refine the representative fingerprints of the selected geographic space based upon the selected user wireless fingerprint.

If it is determined to refine the representative fingerprints of the geographic space, then at step 612, the refinement is performed. The refinement may include adding the selected user wireless fingerprint as a representative fingerprint for the best match geographic space. According to another embodiment, refinement may include replacing one of the current representative fingerprints with the selected user wireless fingerprint. In yet another embodiment, refinement may include changing the value of a current representative fingerprint by, for example, averaging one or more of the current representative fingerprints with the selected user fingerprint.

If, at step 606, it is determined that no match was found for the selected user wireless fingerprint, then at step 616, it is determined whether to add a new geographic space to the set of known geographic spaces. Factors that may be considered in the determination at step 616 can include, but are not limited to, the size of the cluster from which the selected user wireless fingerprint was selected, and the value of the selected user wireless fingerprint. For example, if the currently selected cluster is a large cluster with many unique mobile terminals, then it is likely that the cluster is associated with a popular geographic space, and therefore a new geographic space is added to the set of known geographic spaces.

If it is determined to add a space based upon the selected cluster to the set of known geographic spaces, then, at step 618, the space is added to the set of known geographic spaces. Adding a space can include creating an entry in the list of known geographic spaces, and associating the new geographic space with the selected user wireless fingerprint.

After the new geographic space is added, at step 620, the system may proceed to select up to a predetermined number of user wireless fingerprints from the selected cluster to be used as representative samples for the newly added geographic space.

Figure 7D:
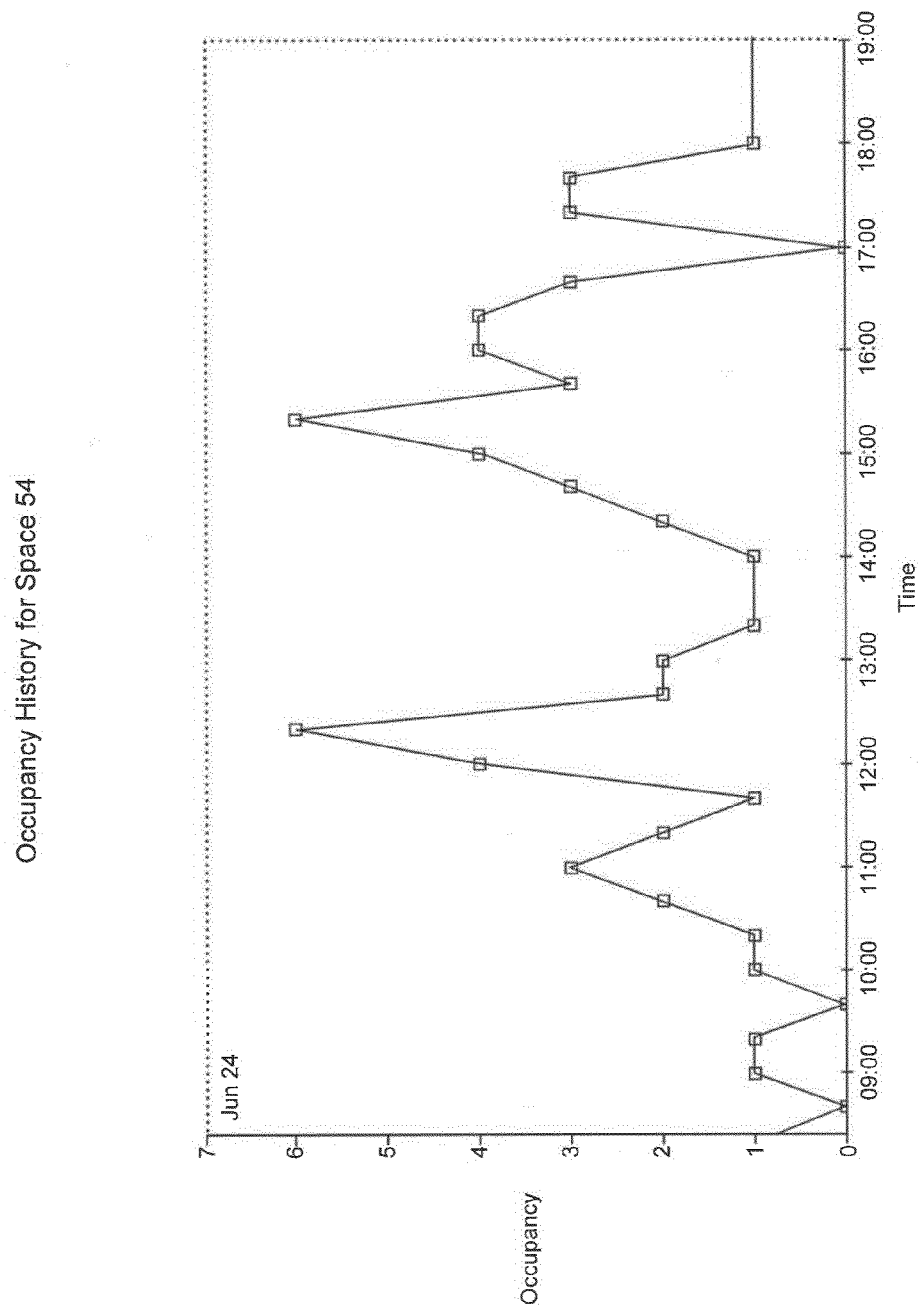
FIG. 7D illustrates an example display of occupancy of a selected geographic space, according to an embodiment.

FIGS. 7A-7D graphically illustrates example output of some embodiments. FIG. 7A graphically illustrates proximity information for a selected user Alice over 4 days. As illustrated, user Alice was in proximity to several other users (shown on the y-axis), and spent the most time in proximity to user mig2. Alice is shown in proximity to mig2 on multiple occasions including from about 18:00 pm June 21 to about 12:00 pm almost continuously. FIG. 7B graphically illustrates an event that started about 18:05 and ended after 18:45 on June 21. Five users (shown on the y-axis) participated in the event, with user mig2 spending the most time at the event. User Jeff was present only for the first part, and user mig2 was present only for a few minutes towards the end of the event. FIG. 7C graphically illustrates the utilization of several known geographic spaces over two days. It can be seen that "Space 54" is the most utilized space, and that only three of the spaces had any utilization. FIG. 7D graphically illustrates that occupancy history of "Space 54" during a day. It can be seen that up to 6 users were in "Space 54" simultaneously.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   accessing proximity records, wherein each proximity record includes user information comprising at least a first user identifier and a second user identifier respectively identifying a first user and a second user, and time information specifying when the first user and the second user have respective wireless fingerprints that are within a threshold fingerprint distance of each other;
clustering the proximity records based upon the time information and the user information to generate a plurality of clusters;
identifying an event corresponding to a generated cluster from the generated plurality of clusters;
identifying a geographic space associated with the event, wherein the identifying the geographic space comprises
comparing one or more wireless fingerprints derived from one or more proximity records of the generated cluster to one or more representative wireless fingerprints associated with the geographic space; and
determining, based upon the comparison, a match between the generated cluster and the geographic space; and
outputting information related to the identified event and the identified geographic space.

2. The computer-implemented method of claim 1, wherein the output information includes names of participants and event times for respective identified one or more events.

3. The computer-implemented method of claim 1, wherein said each proximity record further includes a proximity status indicating whether the first user and the second user are in proximity.

4. The computer-implemented method of claim 1, wherein said each proximity record further includes a first wireless fingerprint corresponding to the first user and a second wireless fingerprint corresponding to the second user.

5. The computer-implemented method of claim 1, wherein the match is determined if the compared wireless fingerprints are within a threshold wireless fingerprint distance.

6. The computer-implemented method of claim 1, wherein identifying at least one geographic space further comprises: refining the one or more representative wireless fingerprints associated with at least one of a plurality of geographic spaces based upon one or more compared proximity records.

7. The computer-implemented method of claim 1, further comprising:
adding a new geographic space corresponding to said event when no existing geographic spaces match the event based upon one or more wireless fingerprints associated with the event.

8. The computer-implemented method of claim 1, further comprising:
determining a profile of visited events and geographic spaces for a user based upon the generated clusters and geographic spaces associated with respective ones of the generated clusters.

9. The computer-implemented method of claim 1, further comprising:
determining occupancy of respective ones of geographic spaces based upon associated ones of the generated clusters.

10. The method of claim 1, wherein the clustering comprises:
determining connected components of a graph, wherein the graph comprises ones of said proximity records as vertices, and wherein the graph further comprises an edge between two vertices if only if the corresponding proximity records that vertices overlap in time information or in user information.

11. A system comprising:
at least one processor;
at least one memory coupled to the processor;
a proximity record module configured to be executed on the at least one processor and further configured to access proximity records, wherein each proximity record includes user information comprising at least a first user identifier and a second user identifier respectively identifying a first user and a second user, and time information specifying when the first user and the second user have respective wireless fingerprints that are within a threshold fingerprint distance of each other;
a proximity record clustering module configured to be executed on the at least one processor and further configured to cluster the proximity records based upon the time information and the user information to generate a plurality of clusters;
an event identification module configured to be executed on the at least one processor and further configured to identify an event corresponding to a generated cluster from the generated plurality of clusters;
a geographic space identification module configured to be executed on the at least one processor and further configured to identify a geographic space associated with the event, wherein the identifying the geographic space comprises
comparing one or more wireless fingerprints derived from one or more proximity records of the generated cluster to one or more representative wireless fingerprints associated with the geographic space; and
determining, based upon the comparison, a match between the generated cluster and the geographic space; and
an output module configured to be executed on the at least one processor and further configured to output information related to the identified event and the identified geographic space.

12. The system of claim 11, wherein the geographic space identification module is further configured to:
add a new geographic space corresponding to said event when no existing geographic spaces match the event based upon one or more wireless fingerprints associated with the event.

13. The system of claim 11, wherein the output module is further configured to determine occupancy of respective ones of geographic spaces based upon associated ones of the generated clusters.

14. An article of manufacture comprising a non-transitory computer readable storage medium encoding instructions thereon, that in response to execution by a computing device cause the computing device to perform operations comprising:
accessing proximity records, wherein each proximity record includes user information comprising at least a first user identifier and a second user identifier respectively identifying a first user and a second user, and time information specifying when the first user and the second user have respective wireless fingerprints that are within a threshold fingerprint distance of each other;
clustering the proximity records based upon the time information and the user information to generate a plurality of clusters;
identifying an event corresponding to a generated cluster from the generated plurality of clusters;
identifying a geographic space associated with the event, wherein the identifying the geographic space comprises
comparing one or more wireless fingerprints derived from one or more proximity records of the generated cluster to one or more representative wireless fingerprints associated with the geographic space; and determining, based upon the comparison, a match between the generated cluster and the geographic space; and outputting information related to the identified event and the identified geographic space.

* * * * *